US009994492B2

(12) United States Patent
Ward et al.

(10) Patent No.: US 9,994,492 B2
(45) Date of Patent: Jun. 12, 2018

(54) FERTILISER COATING CONTAINING MICRONUTRIENTS

(71) Applicant: YARA UK LIMITED, Lincolnshire (GB)

(72) Inventors: Stuart Charles Ward, Selby (GB); Victoria Anne Butler, Goole (GB); Torstein Obrestad, Ulefoss (NO); Terje Tande, Langesund (NO)

(73) Assignee: Yara UK Limited, Lincolnshire (GB)

( * ) Notice: Subject to any disclaimer, the term of this patent is extended or adjusted under 35 U.S.C. 154(b) by 164 days.

(21) Appl. No.: 14/769,005

(22) PCT Filed: Feb. 20, 2014

(86) PCT No.: PCT/GB2014/050494
§ 371 (c)(1),
(2) Date: Aug. 19, 2015

(87) PCT Pub. No.: WO2014/128468
PCT Pub. Date: Aug. 28, 2014

(65) Prior Publication Data
US 2015/0376076 A1    Dec. 31, 2015

(30) Foreign Application Priority Data
Feb. 20, 2013    (GB) .................... 1302997.0

(51) Int. Cl.
| | |
|---|---|
| *C05D 9/02* | (2006.01) |
| *C05G 3/00* | (2006.01) |
| *C05C 9/00* | (2006.01) |
| *C05B 17/00* | (2006.01) |
| *C05C 1/00* | (2006.01) |
| *C05C 5/00* | (2006.01) |
| *C05C 5/04* | (2006.01) |

(52) U.S. Cl.
CPC .............. *C05C 9/005* (2013.01); *C05B 17/00* (2013.01); *C05C 1/00* (2013.01); *C05C 5/005* (2013.01); *C05C 5/04* (2013.01); *C05D 9/02* (2013.01); *C05G 3/007* (2013.01); *C05G 3/0011* (2013.01); *C05G 3/0041* (2013.01)

(58) Field of Classification Search
None
See application file for complete search history.

(56) References Cited

U.S. PATENT DOCUMENTS

| | | | | |
|---|---|---|---|---|
| 3,353,949 A | * | 11/1967 | Nau .................... | C05D 9/02 71/1 |
| 3,514,273 A | | 5/1970 | Lee et al. | |
| 3,523,019 A | * | 8/1970 | Silverberg ............. | C05D 9/02 71/36 |
| 3,560,192 A | * | 2/1971 | Cicco ..................... | C05D 9/02 71/1 |
| 3,580,715 A | * | 5/1971 | Dilday ................. | C05G 3/0023 71/28 |
| 3,692,529 A | † | 9/1972 | Rychman | |
| 3,961,932 A | * | 6/1976 | Miller ..................... | C05B 1/02 71/1 |
| 3,982,920 A | * | 9/1976 | Cross ..................... | C05D 9/02 514/772 |
| 4,243,676 A | | 1/1981 | Ali | |
| 4,427,719 A | * | 1/1984 | Moore ..................... | B01J 2/30 427/184 |
| 4,657,576 A | | 4/1987 | Lambie | |
| 5,112,379 A | * | 5/1992 | Young ..................... | C05D 9/00 71/31 |
| 5,360,465 A | * | 11/1994 | Buchholz .................. | B01J 2/30 71/11 |
| 5,560,768 A | * | 10/1996 | Gordonov ............ | C05G 3/0023 427/185 |
| 5,654,033 A | * | 8/1997 | McNabb .................. | C05C 3/00 427/212 |
| 5,766,302 A | * | 6/1998 | Lefroy ................. | C05G 3/0029 504/101 |
| 2005/0076687 A1 | | 4/2005 | Whittington | |
| 2007/0180877 A1 | * | 8/2007 | Anderson ................. | C05B 7/00 71/31 |
| 2008/0022740 A1 | | 1/2008 | Saarikko et al. | |
| 2009/0048319 A1 | * | 2/2009 | Kohle .................... | A01N 43/50 514/383 |
| 2014/0137616 A1 | * | 5/2014 | Peacock ............... | C05G 3/0088 71/25 |

FOREIGN PATENT DOCUMENTS

| | | |
|---|---|---|
| CN | 102358710 | 2/2012 |
| CN | 102603431 | 7/2012 |

(Continued)

OTHER PUBLICATIONS

United Kingdom Combined Search and Examination Report for corresponding Patent Application No. GB1302997.0 dated Jul. 1, 2013.
United Kingdom Combined Search and Examination Report for Patent Application No. GB1402971.4 dated Aug. 20, 2014.
WPI/Thomson XP-002726978, online database used in preparation of United Kingdom Search Report.
International Search Report and Written Opinion for corresponding Patent Application No. PCT/GB2014/050494 dated Jul. 22, 2014.
International Preliminary Report on Patentability for corresponding Patent Application No. PCT/GB2014/050494 dated Jun. 16, 2015.

*Primary Examiner* — Wayne Langel

(74) *Attorney, Agent, or Firm* — Renner, Otto, Boisselle & Sklar, LLP

(57) ABSTRACT

A single-step method for preparing a free-flowing, non-dusting micronutrient-coated particulate solid fertilizer material, the method comprising applying a single fluid onto particulate solid fertiliser material at ambient temperature without chemical reaction or chelation, said single fluid comprising a suspension of one or more micronutrient materials in an oil.

24 Claims, No Drawings

(56) References Cited

FOREIGN PATENT DOCUMENTS

| | | |
|---|---:|---:|
| GB | 954555 | 4/1964 |
| GB | 2490250 | 10/2012 |
| JP | 2007-224054 | 9/2007 |
| WO | 97/19030 | 5/1997 |
| WO | 99/15480 | 4/1999 |
| WO | 99/63817 | 12/1999 |
| WO | 30/071855 | 9/2003 |
| WO | 2004/047516 | 6/2004 |
| WO | 2005/073355 | 8/2005 |
| WO | 2011/080764 | 7/2011 |
| WO | 2011/103617 | 9/2011 |

\* cited by examiner
† cited by third party

FERTILISER COATING CONTAINING MICRONUTRIENTS

This application is a national phase of International Application No. PCT/GB2014/050494 filed Feb. 20, 2014 and published in the English language, which claims priority to GB 1302997.0 filed Feb. 20, 2013, which are all hereby incorporated herein by reference.

INTRODUCTION

The invention relates to single-step method of preparing a free-flowing, non-dusting micronutrient-coated particulate solid fertiliser material, the method comprising applying a single oil-based suspension of one or more micronutrient materials onto particulate solid fertiliser material, as well as to a formulation for preparing a free-flowing, non-dusting micronutrient-coated particulate solid fertiliser material, and the free-flowing, non-dusting micronutrient-coated particulate solid fertiliser material, obtained therewith.

BACKGROUND

Plant nutrients can be divided into three main classes:
Primary or macronutrients: nitrogen (N), phosphorus (P) and potassium (K).
Secondary nutrients: calcium (Ca), magnesium (Mg), sulphur (S), sodium (Na).
Micronutrients: boron (B), copper (Cu), iron (Fe), manganese (Mn), molybdenum (Mo), zinc (Zn).

Particulate solid forms of inorganic fertiliser such as granules or prills represent the most common type of fertiliser used in agriculture, incorporating at least the primary or macronutrients (the so-called NPK-fertilizers), and often secondary nutrients. Particulate solid fertilisers are commonly applied to the soil in order to provide the growing crop with the bulk of its requirement for primary and secondary nutrients.

There is often a requirement to also include micronutrients in particulate solid fertiliser products in order to meet the agronomic requirements of the crop. This can be achieved by incorporating micronutrients during the prilling or granulation process. Alternatively, WO 9915480 (Norsk Hydro, 1999) describes how micronutrients can be coated onto particulate fertilisers by application of an aqueous solution of an acid and a mineral base. However, practical considerations in high volume production operations imply that it is difficult to satisfy the widely different nutrient requirements of different crops and different soil types using any of the aforementioned approaches. Furthermore, the use of an aqueous solution on an hygroscopic material such as calcium ammonium nitrate and ammonium nitrate fertilizer is not recommended.

Physical blending of powdered or granular micronutrient components with solid fertilisers offers more flexibility in terms of manufacture but the end product suffers from several disadvantages. The differences in particle size and density between the different components can lead to segregation during storage and handling which can result in uneven application to the soil and crop. Another disadvantage, particularly where powdered micronutrients are used, is the dusting that can occur during transfer and application. This not only leads to uneven application but also presents a potential environmental or health and safety risk.

WO 03071855 (Ade & Company, 2003) teaches a method by which a fertiliser can be coated with micronutrient applied in the form of a fine, dry powder which is claimed to produce a low dusting product. However, if the original fertiliser substrate is itself naturally dusty, this method offers no possibility of reducing the inherent dustiness.

These problems can be reduced to a certain extent by applying an oil, surfactant or binding polymer during the blending process, e.g. by spraying, but this adds a further step to the process and thereby increases the complexity of the blending operation.

Micronutrients may be added to solid fertiliser by coating the granules using an aqueous slurry or suspension of the micronutrient components. This method can result in a low dusting product with an even distribution of micronutrient. However, the introduction of water using this technique (albeit a very small the amount) can compromise the storage stability of the solid fertiliser by increasing its tendency to cake or by reducing the strength of the prills or granules, especially with nitrate based solid hygroscopic materials such as calcium ammonium nitrate and ammonium nitrate, and with urea. Furthermore, it is easy to make a mistake by adding more of the aqueous slurry or suspension to the solid fertilizer than necessary, which has a detrimental effect on the whole batch in terms of swelling and caking tendency.

It has been proposed in U.S. Pat. No. 3,692,529 (Rychman, 1972) to treat solid carrier particles with an adhering oil, and a pigment or colouring compound. Subsequently, the thus oiled carrier particles are blended with granular solids to provide a free-flowing non-segregating, homogeneous composition. The function of the oiled carrier particles is to provide free-flowing properties to the granular solids composition which would otherwise be non-free flowing. The granular solids are liable to give off dust, and may require further processing steps to suppress dusting.

Other approaches have required special apparatus to add components separately and create chemical or chelation reactions in situ, in particular between the particulate solid fertilizer material and the components, and/or the use of elevated temperatures. Examples are: US 2005/076687, CN102603431, WO 2011/080764, U.S. Pat. No. 4,657,576, GB 954,555 and CN 102358710.

Hence, there is a need for a better method to post-treat solid fertilizer particles to at least party overcome the problems from the prior art.

SUMMARY OF THE INVENTION

Aspects of the invention are specified in the independent claims. Preferred features are specified in the dependent claims.

By using a pre-prepared suspension of one or more micronutrient components in an oil, coating of the solid fertiliser can be carried out in a simple single-stage blending or coating operation using standard fertiliser blending equipment at ambient temperatures (herein defined as 0° C. or greater, typically 10° C. or greater; and 40° C. or less, typically 30° C. or less). The method according to the invention results in an evenly coated fertiliser which is non-dusting and has excellent storage characteristics. The use of an oil-based suspension not only prevents the micronutrients from dusting but also suppresses dust present in the granular fertiliser itself. No additional non-aqueous liquid or other anti-dusting agent is required during blending. Furthermore, we have found that the application of the oil-based suspension can have an additional beneficial effect on storage and handling characteristics of the final product by reducing the caking tendency.

The micronutrient suspension is prepared by blending a suitable source of micronutrient in the form of a finely ground powder with an oil.

Suitable micronutrient sources are any suitable compounds of the micronutrient elements boron, copper, iron, manganese, molybdenum and zinc, such as but not limited to salts, for instance sulphates, oxysulphates, nitrates, borates, chlorides, oxychlorides and phosphates; minerals; metal chelates, for instance EDTA, HEDTA, DTPA, EDDHA; oxides, carbonates or hydroxides.

We have found that the best results in terms of coverage and low dusting are obtained when the particles in the micronutrient material have sizes substantially in the range of 0.1 to 100 μm, more preferably between 0.1 and 50 μm, even more preferably to have 90% of particles between 0.1 and 50 μm, ideally to have 90% of particles between 0.1 and 20 μm. Such a fine particle size may be obtained by milling.

The oil can be any suitable natural, mineral or synthetic oil, such as a mineral white oil, but preferably an environmentally acceptable oil such as a vegetable oil is used. Suitable vegetable oils include rapeseed oil, soya oil, sunflower oil, linseed oil, castor oil, or other similar vegetable oils. Other oils, such as methylated oils or modified vegetable oils could also be used, but not water-miscible materials.

Surprisingly, vegetable oil turned out to be a much better oil for dispersing said particles, in particular zinc oxide particles, than mineral white oil.

It is advantageous to achieve as high a loading of the micronutrient in the suspension as possible, as this allows a sufficiently high addition of micronutrient onto the solid fertiliser without over-loading the fertiliser with oil which can make the final product sticky and difficult to handle.

In a preferred embodiment, a solids loading of 30 to 80 weight %, more preferably a solids loading of 50 to 80 weight % should be achieved. The loading depends on the type of carrier oil, the type of dispersant, etc. As an example, it can be mentioned that rapeseed oil with 60 weight % zinc oxide was pumpable and could be used to coat fertiliser. However, rapeseed oil with 70 weight % zinc oxide turned out to be too thick to be pumped, but by adding a dispersion agent, the amount could be increased to 70 weight % without increasing the viscosity of the resulting dispersion. It is an inventive aspect of the invention that it has been found possible to produce a dispersion with 65 to 70 weight % zinc oxide to coat a fertilizer product such that it contains 0.5 weight % Zn, which is an agriculturally relevant amount, yet without using too much oil such that the fertilizer product does not become sticky and prone to caking.

It is also advantageous to achieve a mobile liquid form such that the micronutrient suspension can be easily pumped and dosed into the fertiliser blend. In order to achieve a liquid suspension at this high solids loading a dispersing agent may need to be incorporated into the formulation. Suitable dispersing agents may be natural or synthetic and include fatty acids, mono- and diglycerides, polycondensed fatty acids, polymerized fatty acid esters, fatty acid modified polyesters, non-ionic block copolymers.

It is also desirable for the micronutrient suspension to have good stability to allow for storage so it is necessary to prevent rapid settlement of the micronutrient from the suspension. Accordingly, the formulation may include any one or a combination of dispersion agents, rheology agents, thickeners and anti-settle agents. Suitable rheology agents, thickeners and anti-settling agents include clays such as sepiolite, bentonite, attapulgite, hectorite, palygorscite and organically modified clays; polyurethanes; polyurea; hydrophilic fumed silica; hydrophobic fumed silica; fumed mixed oxides.

An advantage of using an oil as dispersant is that it may disperse both water-soluble and non-water soluble particles in the same way. An example of a water-soluble material is zinc sulphate ($ZnSO_4$). If water is used as a coating medium, it will dissolve the water-borne particles and disperse the non-water-borne particles, giving a different and undesired coating behaviour.

A colorant, either dye or pigment, may be added to the formulation in order to aid monitoring of the coating process and to enhance the physical appearance of the final fertiliser product. Examples of suitable pigments classes include, but are not limited to, Phthalocyanine Blues (for example, C.I. Pigment Blues 15, 15:1, 15:2, 15:3, 15:4) and Aluminium Chlorophthalocyanine (for example, C.I. Pigment Blue 79); Ultramarine Blue; red, yellow and green iron oxides.

The oil containing the dispersed micronutrients can be added to the particulate solid fertiliser by any conventional means, such as spraying the oil dispersion on to the particulate fertiliser during blending in a drum blender, or spraying on to the particulate fertiliser after which the product is blended in a drum blender, or spraying on to the particulate fertiliser on a moving conveyor belt.

The invention will now be further described with reference to the following examples. In Examples 1 and 2, the dispersant used was Decal FD (Devine Chemicals) hydroxystearic acid polymer and the blue pigment dispersion was Dispers Blue LS6900 (BASF) Pigment Blue 15:1.

EXAMPLE 1

The following example shows the formulation required to make 1 kg of an oil-based suspension of zinc oxide containing 50 weight % Zn (zinc oxide obtained from Umicore, Belgium, having an average particle size of approximately 0.5 μm, 90% of particles less than 2 μm).

| | |
|---|---|
| Rapeseed Oil | 0.3320 kg |
| Dispersant | 0.0300 kg |
| Blue Pigment Dispersion | 0.0150 kg |
| Zinc Oxide | 0.6230 kg |
| | 1.0000 kg |

The above components are added in the order listed into a stirred beaker and mixing continued for 30 minutes. The resultant product is a fluid suspension with a viscosity of 4220 cPs at 20° C. as measured on a Brookfield LVD viscometer using spindle 3 at 12 rpm.

Samples of the product were subjected to storage testing under various conditions. A sample stored at ambient temperature for a period of 4 months remained stable and fluid with no significant settlement of the suspended solids.

The zinc oxide suspension described above was coated onto prilled urea at 20° C. using a rate equivalent to 5 liters per tonne of urea using the following method:

1 kg of prilled urea was added to a labscale drum blender and the blender started. 5 ml of the zinc oxide suspension was introduced via a syringe and blending continued for 2 minutes. The resultant product was evenly coated with micronutrient (equivalent to 0.47 weight % Zn), dust-free and free flowing.

The suspension described in Example 1 was also coated onto two types of granular fertiliser, NPK 27-4-4 and calcium ammonium nitrate (CAN) (both obtained from Yara) at 20° C. Samples of both fertiliser grades (finished products obtained from the production plant and already treated with an anti-caking coating) were treated with the zinc oxide suspension using a rate to achieve a coating equivalent to 0.81 weight % on to the fertiliser. The resultant samples were tested for caking tendency compared against uncoated control samples of each fertiliser (that is, without the normal anti-caking coating) and samples of the normal finished fertiliser. The tests were carried out at 25° C. with 60% Relative Humidity and the results are shown in Table 1 below. The lower figures for the coated samples indicate less tendency to cake than the untreated samples and demonstrates the improvement conferred by the treatment.

TABLE 1

Caking index for various fertilizers according to Example 1

|  | Caking Index (gf) |
|---|---|
| Uncoated NPK 27-4-4 | 3017 |
| NPK 27-4-4 finished product from plant | 1175 |
| NPK 27-4-4 finished product + coated with Example 1 | 917 |
| Uncoated CAN | 975 |
| CAN finished product from plant | 583 |
| CAN finished product + coated with Example 1 | 350 |

The suspension described in Example 1 was also coated onto urea, calcium ammonium nitrate and an NPK blend in factory conditions with an ambient temperature of 30° C. at rates ranging from 2.1 liters per metric tonne of granular fertiliser to 4.2 liters per metric tonne of fertiliser. The resultant coated fertiliser was well-coated and free-flowing with low dust levels.

EXAMPLE 2

The following example shows a formulation to make 1 kg of an oil-based suspension of colemanite, a boron-containing mineral with the chemical formula $CaB_3O_4(OH)_3 \cdot H_2O$, containing about 7 weight % boron. (colemanite obtained from Eti Holdings AS, Turkey; ground to achieve a particle size specification of 90%<50 μm—the particle size distribution of the actual batch used was 90%<13 μm; 50%<7 μm). The clay thickener was Pangel B5 (Tolsa S.A.) Sepiolite clay.

| Rapeseed Oil | 0.3988 kg |
|---|---|
| Dispersant | 0.0357 kg |
| Blue Pigment Dispersion | 0.0107 kg |
| Clay thickener | 0.0054 kg |
| Colemanite | 0.5494 kg |
|  | 1.0000 kg |

The above components are added in the order listed into a stirred beaker and mixing continued for 30 minutes. The resultant product is a fluid suspension with a viscosity of 3180 cPs at 20° C. measured on a Brookfield LVD viscometer using spindle 3 at 12 rpm.

The suspension described in Example 2 was coated onto prilled urea at 8° C. using a rate equivalent to 5 liters per metric tonne of granular fertiliser. The resultant coated fertiliser was well-coated with micro-nutrient (equivalent to 0.05 weight % of boron) and free-flowing with low dust levels

EXAMPLE 3

The following example shows a formulation to make 1 kg of an oil-based suspension of cuprous oxide, chemical formula $Cu_2O$, containing about 86 weight % copper and with a particle size specification of 99%<5 μm; 80%<2 μm (obtained from Nordox Industries AS, Norway). The dispersant was Synthro Pon 9TD (Synthron) and the clay thickener was Pangel B5 (Tolsa S.A.) Sepiolite clay.

| Methylated Rapeseed Oil | 0.1570 kg |
|---|---|
| Dispersant | 0.0400 kg |
| Clay thickener | 0.0030 kg |
| Cuprous Oxide | 0.8000 kg |
|  | 1.0000 kg |

The above components are added in the order listed into a stirred beaker and mixing continued for 30 minutes. The resultant product is a fluid suspension with a viscosity of 2900 cPs at 20° C. measured on a Brookfield LVD viscometer using spindle 3 at 12 rpm.

The suspension described in Example 3 was also coated onto prilled urea at 15° C. using a rate equivalent to 5 liters per metric tonne of granular fertiliser. The resultant coated fertiliser was well-coated with micro-nutrient and free-flowing with low dust levels

EXAMPLE 4

The following example shows a formulation to make 1 kg of an oil-based suspension of manganese carbonate chemical formula $MnCO_3$, containing about 44 weight of manganese (obtained from Erachem Comilog S.A.). The manganese carbonate used was micronized to achieve a particle size specification of 100%<50 μm; 90%<15 μm; 50%<5 μm. The dispersant was Decal FD (Devine Chemicals) and the fumed silica was Aerosil R812 (Evonik Industries AG).

| Methylated Rapeseed Oil | 0.2991 kg |
|---|---|
| Dispersant | 0.0290 kg |
| Blue Pigment Dispersion | 0.0029 kg |
| Manganese Carbonate | 0.6603 kg |
| Fumed Silica | 0.0087 kg |
|  | 1.0000 kg |

The above components are added in the order listed into a stirred beaker and mixing continued for 30 minutes. The resultant product is a fluid suspension with a viscosity of 2500 cPs at 20° C. measured on a Brookfield LVD viscometer using spindle 3 at 12 rpm.

The suspension described in Example 4 was also coated onto granular calcium nitrate (which was already treated with an anti-caking coating) at 24° C. using a rate equivalent to 5 liters per metric tonne of granular fertiliser. The resultant coated fertiliser was well-coated with micro-nutrient and free-flowing with low dust levels It will be understood that the invention is not limited to the exemplified dispersing agent, and that any suitable natural and/or synthetic dispersant may be used. Suitable dispersing agents include, but are not limited to: fatty acids (FA), mono- and diglycerides, polymeric fatty acid derivatives such as Afcona 6226, Atlox LP1 and Decal FD and others.

It will also be understood that the C.I. Pigment Blue 15:1 used in the examples is non-limiting and that other colorants known to those skilled in the art may be used. Examples include: Phthalocyanine blue (C.I. Pigment Blue 15, 15:1, 15:2, 15:3, 15:4), Aluminium Chlorophthalocyanine (C.I. Pigment blue 79). Other pigments than blue pigments may, of course, also be used.

SUMMARY

The invention provides a method for the preparation and use of oil-based dispersions of plant micronutrients for coating solid granular, prilled or blended fertilisers.

Benefits of the invention include:
1) Greater production flexibility than incorporation of micronutrients during the granulation or prilling process.
2) Superior coverage and the elimination of segregation and dusting compared to dry blending processes.
3) Simple one step (single-step) application process of applying only a single fluid (eliminating the need to add oil separately) without chemical or chelation reactions occurring during the process, in particular between the particulate solid fertilizer material and the single fluid comprising a suspension of one or more micronutrient materials in an oil.
4) Reduces the caking tendency of the final solid fertiliser when compared with aqueous-based systems.
5) Application at ambient temperatures provides a simple, robust process that does not require use of an external source of heat.

The invention claimed is:

1. A single-step method for preparing a free-flowing, non-dusting micronutrient-coated particulate solid fertiliser material, the method comprising applying a single fluid onto particulate solid fertiliser material at ambient temperature without chemical reaction or chelation, said single fluid being pumpable at ambient temperature and comprising a suspension of one or more micronutrient materials in an oil; wherein 90% of the micronutrient particles in the suspension have sizes in the range of 0.1 to 50 μm.

2. The method according to claim 1, wherein the suspension has a solids loading in the range 30 to 80 weight %.

3. The method according to claim 2, wherein the suspension has a solids loading in the range 50 to 80 weight %.

4. The method according to claim 1, wherein the micronutrient suspension has a viscosity in the range 500 to 6000cPs at 20° C. measured on a Brookfield LVD viscometer using Spindle 3 at 12 rpm.

5. The method according to claim 4, wherein the micronutrient suspension has a viscosity in the range 2000 to 5000 cPs at 20° C. measured on a Brookfield LVD viscometer using Spindle 3 at 12 rpm.

6. The method according to claim 1, wherein the suspension is blended with the fertiliser material in a ratio in the range 1 to 10 liters of fertiliser material.

7. The method according to claim 6, wherein the suspension is blended with the fertiliser material in a ratio in the range 2 to 6 liters per tonne of fertiliser material.

8. The method according to claim 1, wherein at least one of said one or more micronutrient materials is water soluble.

9. The method according to claim 8, wherein said at least one water soluble micronutrient material is zinc sulphate, manganese sulphate, sodium borate, boric acid, iron sulphate, iron EDTA, iron EDDHA, copper sulphate or sodium molybdate.

10. The method according to claim 1, wherein the 90% of micronutrient particles in the suspension have sizes between 0.1 and 20 μm.

11. The method according to claim 1, wherein the micronutrient comprises at least one compound having an element selected from the group consisting of: boron, copper, iron, manganese, molybdenum, zinc, and mixtures thereof.

12. The method according to claim 1, wherein the oil is a vegetable oil.

13. The method according to claim 1, wherein the suspension includes a dispersing agent.

14. The method according to claim 1, wherein the suspension includes a rheology agent, thickener or anti-settling agent.

15. The method according to claim 1, wherein the suspension includes a colorant material.

16. The method according to claim 1, further comprising preparing the suspension by blending an oil with particles of a compound containing the micronutrient material; wherein 90% of the micronutrient particles in the suspension have sizes in the range of 0.1 to 50 μm.

17. An oil-based suspension of particles of a micronutrient material, comprising at least one compound having an element selected from the group consisting of: boron, copper, iron, manganese, molybdenum, zinc, and mixtures thereof; wherein 90% of the particles in the micronutrient material have sizes between 0.1 and 50 μm, and the suspension has a solids loading in the range 30 to 80 weight %, and is pumpable at ambient temperature.

18. The oil-based suspension of a micronutrient material according to claim 17, wherein the micronutrient material is a salt; a mineral; a metal chelate; an oxide, carbonate or hydroxide; and the oil is a vegetable oil.

19. The oil-based suspension of a micronutrient material according to claim 18, wherein the salt is a sulphate, oxysulphate, nitrate, borate, chloride, oxychloride, or phosphate.

20. The oil-based suspension of a micronutrient material according to claim 17, wherein the micronutrient material is colemanite, boric acid, sodium borate, copper oxide, copper hydroxide, copper carbonate, copper sulphate, copper oxychloride, iron sulphate, iron EDTA, iron EDDHA, manganese carbonate, manganese sulphate, sodium molybdate, zinc oxide or zinc sulphate, and the oil is a vegetable oil.

21. The oil-based suspension of particles of a micronutrient material according to claim 17, wherein 90% of the particles in the micronutrient material have sizes between 0.1 and 20 μm.

22. The oil-based suspension of particles of a micronutrient material according to claim 17, wherein the suspension has a solids loading in the range 50 to 80 weight %.

23. A free-flowing, non-dusting micronutrient-coated particulate solid fertiliser material comprising: particulate solid fertiliser coated with a suspension, the suspension comprising one or more micronutrient materials in an oil, wherein 90% of the micronutrient materials in the suspension have particle sizes in the range of 0.1 to 50μm, and wherein the suspension has a solids loading in the range of 30 to 80 weight %.

24. The free-flowing, non-dusting micronutrient-coated particulate solid fertiliser material according to claim 23, wherein 90% of the particles in the micronutrient material have sizes between 0.1 and 20 μm.

* * * * *